May 14, 1968  C. SAVIN ET AL  3,382,591
DEVICE AND METHOD FOR DEMONSTRATING ANGLES WITHIN A CIRCLE
Filed Oct. 22, 1965
*Fig. 1*
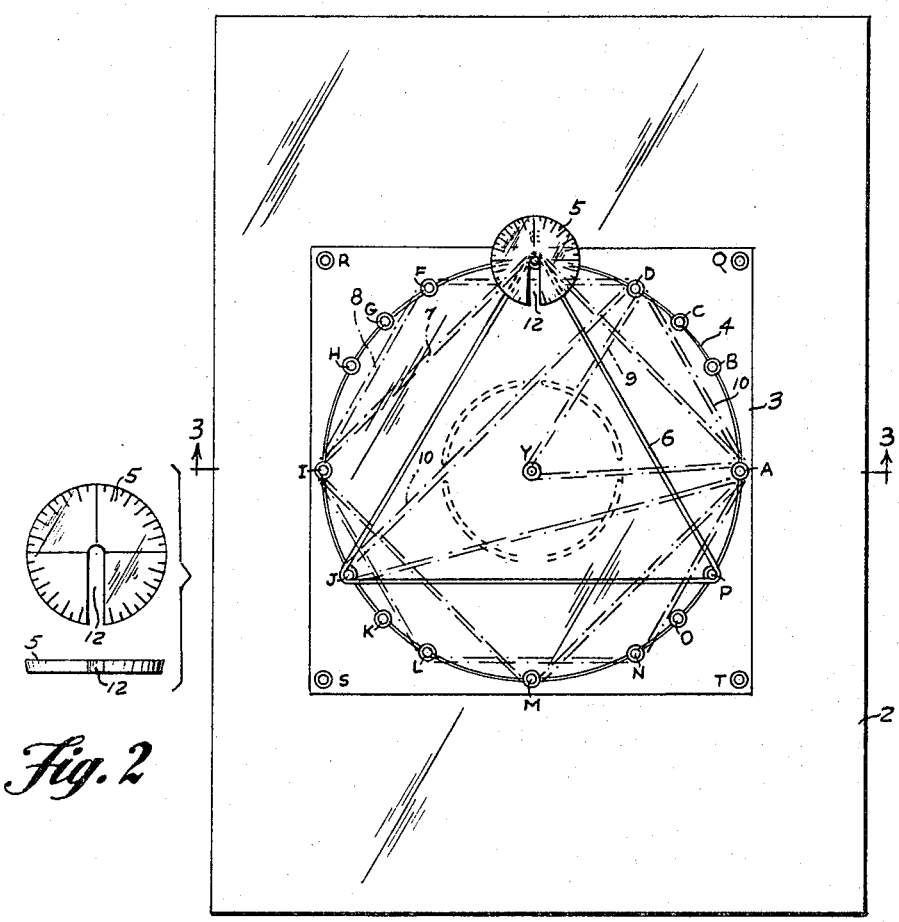
*Fig. 2*
*Fig. 3*
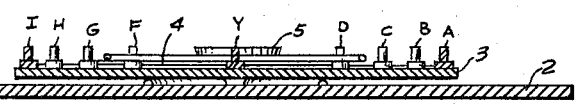
*Fig. 4*
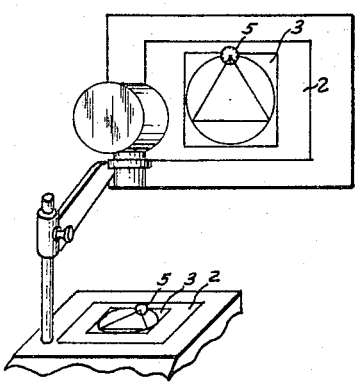
INVENTORS
CORNELIUS SAVIN
ALAN G. VORWALD
BY CHRISTOPHER R. VAGTS
R. E. Meech
ATTORNEYS United States Patent Office 3,382,591
Patented May 14, 1968

3,382,591
DEVICE AND METHOD FOR DEMONSTRATING
ANGLES WITHIN A CIRCLE
Cornelius Savin, Westbury, Alan G. Vorwald, Bethpage,
and Christopher R. Vagts, Huntington, N.Y., assignors
to Antran Corporation, a corporation of New York
Filed Oct. 22, 1965, Ser. No. 500,777
1 Claim. (Cl. 35—34)

ABSTRACT OF THE DISCLOSURE

An animated transparency device for demonstrating visually the characteristics of various angles within a circle and the relation thereof to one another and to the circumference of the circle comprising a square member having a projection arranged at each corner thereof, a circle arranged on the square member with a plurality of similar projections arranged circumferentially therearound at spaced-apart intervals and a similar projection arranged centrally thereof, a flexible member which is adapted to be removably disposed around any desired number of the projections to define various angles so as to demonstrate visually a geometric problem, and a circular protractor adapted to be removably positioned on any one of the projections for the measurement of the various angles defined by the flexible member, the square member and protractor being made of a transparent material of identifying and contrasting colors adapted to be projected on a screen by an overhead projector.

---

This invention relates to a device for visual presentation to large groups of students at one time by overhead projection of a transparent device, and more particularly, to a animated transparency device for and method of teaching mathematical concepts, especially in geometry, by use thereof.

Oftentimes it is difficult for a student especially if he is lacking in imaginative power to grasp the significance of mere drawn lines and their proposed super-position upon each other especially, for example, where geometric concepts are to be developed in relation to the circle, its characteristics, and measurement. The student's mind can often be helped if such circles, lines, angles, etc. can be represented in a tangible form. In order to overcome this disadvantage, a device is provided, in accordance with the present invention, whereby circles, lines, angles, etc. of various types are represented in concrete form and the parts of the device manipulated in order to illustrate many of the elementary geometrical terms and processes employed in making proofs necessary in this branch of mathematical science.

While various devices and methods have been heretofore suggested and used for teaching or training large groups by means of overhead projection of transparent devices, they were not entirely satisfactory. One such device heretofore suggested employed a so-called "still" transparency. Such "still" transparency devices are merely two-dimensional, while animated transparencies are tri-dimensional which is a decided advantage. Animation imparts a lively and more significant movement to the transparency and is much more easily understood. The modern method of teaching tends toward visualizing, manipulating and direct observation which is a decided advantage of teaching by animated transparencies. The inadequacies of these and other existing teaching means and methods is overcome by the present invention.

It is the general object of the present invention to provide animated teaching devices that overcome the insufficiencies of models, facsimilies, cut-away units and other means that have been previously employed to represent circles, angles, etc. for the purpose of teaching students and others.

It is another object of the invention to provide animated teaching devices of such character that each of the several components or parts of the assembly are readily visible and the relative movements of the related parts are all readily visible and understood. The several parts, or at least some of them, are constructed of transparent materials which are of different colors or shades for ready identification so that even though the parts are superimposed or positioned one within or behind the other, they are all immediately and readily recognizable and their several independent and mutual motions are clearly visible and understood.

It is a further object of this invention to provide a teaching aid of the animated transparency type which may be manipulated or actuated even by the student, himself, to observe the various components perform their respective functions and to solve the particular problem.

It is still another object of the present invention to provide animated transparency devices which are compact, light in weight and conveniently portable so as to facilitate handling, transporting, and storing of the devices.

It is still a further object of the invention to provide teaching devices of this type which are relatively inexpensive in their manufacture and which may be readily duplicated or produced in volume and, at the same time, efficient, effective and instructive in their use.

It is a most important object of the present invention to provide a method of and means for teaching mathematical concepts by the overhead projection of animated transparency devices which visually demonstrates the particular problem to be solved.

It is still a more specific object of this invention to provide a method of teaching the concepts of the circle by overhead projection of an animated transparency device, wherein a flexible member or members are positioned within the circle and the various angles formed therein determined visually and comparing the various angles found and the relation thereof with one another and to the circumference of the circle.

Various other objects and advantages of this invention will be more apparent in the course of the following specification, and will be particularly pointed out in the appended claim.

In the accompanying drawings, there is shown for the purpose of illustration, an embodiment which the invention may assume in practice.

In these drawings:

FIG. 1 is a plan view of the animated transparency device in accordance with the present invention, FIG. 2 is a plan and side view of the circular protractor adapted to be used with the device of the present invention, FIG. 3 is a sectional view taken on line 3—3 of FIG. 1, and FIG. 4 is a perspective view of a portion of an overhead projector and screen used in connection with the visual demonstration of the animated transparency device of the present invention.

Referring more particularly to the drawings, the animated transparency device in accordance with the present invention consists of a clear transparent plastic planar base 2 on which there is mounted preferably a square transparent planar member 3 having a circle 4 inscribed thereon. On this member 3 there is arranged around the circumference of the circle 4, a plurality of prongs or projecting portions, designated at A through P on FIG. 1, and a center pin Y. There is also provided similarly a prong or projection portion at each corner of the square member 3 designated as Q, R, S and T. The prongs A through P are located around the circumference 4 at intervals of 30 degrees and 45 degrees, as shown. There is also provided a circular protractor 5 having slot 12 therein for measuring the angles in a manner hereinafter to be described.

Having described the parts and construction of the animated transparency device of the present invention, it functions and is used in the following manner.

The device is positioned, as shown in FIG. 3, on an overhead projector stage with the parts thereof satisfactorily focused on a screen in a well known manner. In order to form a line, a triangle, polygon, or an angle within the circle, simply stretch a rubber band or bands around the appropriate prongs, as shown.

For example, to form a equilateral triangle, stretch a rubber band designated 6, as shown in FIG. 1, around the prongs located at E, J and P. To form a square, stretch a rubber band designated 7 around the prongs located at A, E, I, and M or C, G, K and O.

To form a regular hexagon, stretch a rubber band designated 8 around the prongs located at A, D, F, I, L and N. To form a central angle and an inscribed angle, which intercepts the same arc, stretch a rubber band designated 9 around the prongs Y, A and D, and another band designated 10 around the prongs J, A and D.

The properties of the various shapes and angles formed by the rubber bands in the circle in relation thereto and to the circumference thereof are then explored and pointed out by the instructor to the students. The circular protractor 5 and a ruler is also used to demonstrate additional relations.

The following can be demonstrated by the use of this device:

(a) How the perimeter of a regular polygon approaches the circumference of a circle as the number of sides of the polygon increases. Also, with this circular array, a regular dodecagon (12 sides) can be formed.

(b) Definitions of parts of a circle: radius, diameter, chord, arc, central angle, inscribed angle can be developed.

(c) The sum of the interior angles of the various polygons can be found. "The sum of the interior angles of any polygon of $n$ sides is equal to $(n-2) \times 180$" can be demonstrated.

(d) The properties of simple shapes: triangle, square, rectangle, hexagon, octagon, and dodecagon can also be demonstrated.

(e) The relation between an angle formed by two intersecting chords and the intercepted arcs (the angle formed by two intersecting chords is equal to one half the sum of the intercepted arcs) can be found.

The points Q, R, S, and T are adapted for use for constructing diameters or tangents to the circle 3.

As a result it will be seen that the animated transparency device in accordance with the present invention can be used to demonstrate visually the properties of simple geometric shapes and their relation to the circle, the definition for the parts of a circle, to demonstrate the relation between inscribed angles and central angles in a circle and to demonstrate the relation between a circle and its inscribed and circumscribed polygons.

While there is shown and described an embodiment which the invention may assume in practice, it will be understood that this embodiment is merely for the purpose of illustration and description, and that other forms can be devised within the scope of the invention as defined in the appended claim.

We claim:
1. An animated transparency device adapted to be used with an overhead projector for teaching geometry comprising
    a transparent planar base adapted to be positioned upon the stage of the projector,
    a transparent square planar member mounted on said based having a circle inscribed thereon,
    a plurality of pin-like projections arranged on said square member circumferentially around said circle at least at 30 and 45 degree intervals and a similar pin-like projection arranged centrally thereof,
    a similar pin-like projection arranged on said square member adjacent each corner thereof,
    a flexible member adapted to be disposed around a plurality of pin-like projections so as to define a triangle, a polygon, or any angle having its apex at the respective pin-like projections, and
    a circular protractor adapted to be removably arranged on any one of said pin-like projections for measuring any angle having its apex at said pin-like projection, said flexible member and said protractor adapted to be positioned on and moved to various positions on said pin-like projections so as to demonstrate visually a geometric problem by projecting the base and members on a screen by means of the overhead projector.

References Cited
UNITED STATES PATENTS

| | | | |
|---|---|---|---|
| 507,216 | 10/1893 | Colby. | |
| 2,507,460 | 5/1950 | Schacht | 35—34 |
| 2,573,946 | 11/1951 | Armstead | 35—34 |
| 2,841,889 | 7/1958 | Coale et al. | 35—39 |

FOREIGN PATENTS

| | | |
|---|---|---|
| 1,231,314 | 4/1960 | France. |

EUGENE R. CAPOZIO, *Primary Examiner.*

W. H. GRIEB, *Examiner.*